(12) United States Patent
Jessner et al.

(10) Patent No.: US 12,319,987 B2
(45) Date of Patent: Jun. 3, 2025

(54) BATTERY BOX BOTTOM PART FOR ELECTRIC VEHICLES

(71) Applicant: CONSTELLIUM NEUF-BRISACH, Biesheim (FR)

(72) Inventors: Peter Jessner, Bourgoin-Jallieu (FR); Jocelyne List, Saint Egreve (FR); Estelle Muller, Grenoble (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 723 days.

(21) Appl. No.: 17/439,912

(22) PCT Filed: Mar. 17, 2020

(86) PCT No.: PCT/EP2020/057348
§ 371 (c)(1),
(2) Date: Sep. 16, 2021

(87) PCT Pub. No.: WO2020/187942
PCT Pub. Date: Sep. 24, 2020

(65) Prior Publication Data
US 2022/0181735 A1   Jun. 9, 2022

(30) Foreign Application Priority Data
Mar. 19, 2019 (FR) ...................................... 1902816

(51) Int. Cl.
*H01M 50/249* (2021.01)
*B60K 1/04* (2019.01)
(Continued)

(52) U.S. Cl.
CPC ................ *C22C 21/06* (2013.01); *B60K 1/04* (2013.01); *C22F 1/047* (2013.01);
(Continued)

(58) Field of Classification Search
CPC .. H01M 50/249; H01M 50/24; H01M 50/102; H01M 50/224; H01M 50/145
See application file for complete search history.

(56) References Cited

U.S. PATENT DOCUMENTS

| 5,667,602 A | 9/1997 | Fang et al. |
| 2001/0053477 A1* | 12/2001 | Kitoh .................. H01M 50/545 |
| | | 429/224 |

(Continued)

FOREIGN PATENT DOCUMENTS

| CN | 106207044 A | 12/2016 |
| CN | 205930892 U | 2/2017 |

(Continued)

OTHER PUBLICATIONS

PCT International Search Report for PCT/EP2020/057348, mailed Jun. 12, 2020.
(Continued)

*Primary Examiner* — Kenneth J Douyette
(74) *Attorney, Agent, or Firm* — McBee Moore & Vanik IP, LLC

(57) ABSTRACT

The present invention is directed to a bottom part of a battery box for electric or hybrid motor vehicles made from an aluminium alloy sheet having a thickness between 2 and 6 mm, wherein said aluminum alloy comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and unavoidable impurities up to 0.05 wt. % each and 0.15 wt. % total. Another object of the invention is a method to make a bottom part of battery box according to the invention comprising casting said aluminium alloy into a rolling ingot; homogenizing and/or reheating said rolling ingot; hot rolling and optionally cold rolling said rolling ingot to obtain a sheet with a thickness between 2
(Continued)

mm and 6 mm. The bottom part of battery box of the invention is simultaneously light, resistant against intrusion, sufficiently formable and leak tight, corrosion resistant, able to accommodate temperature variations and sufficiently stiff and strong.

20 Claims, 3 Drawing Sheets

(51) Int. Cl.
C22C 21/06 (2006.01)
C22F 1/047 (2006.01)
H01M 50/102 (2021.01)
H01M 50/145 (2021.01)
H01M 50/224 (2021.01)
H01M 50/233 (2021.01)
H01M 50/24 (2021.01)

(52) U.S. Cl.
CPC ....... *H01M 50/102* (2021.01); *H01M 50/145* (2021.01); *H01M 50/224* (2021.01); *H01M 50/233* (2021.01); *H01M 50/24* (2021.01); *H01M 50/249* (2021.01); *H01M 2220/20* (2013.01)

(56) References Cited

U.S. PATENT DOCUMENTS

| | | | |
|---|---|---|---|
| 2006/0130941 | A1 | 6/2006 | Litalien et al. |
| 2007/0141451 | A1 | 6/2007 | Marukawa et al. |
| 2008/0173488 | A1 | 7/2008 | Takasaki |
| 2009/0236162 | A1 | 9/2009 | Takasaki et al. |
| 2014/0308155 | A1* | 10/2014 | Morinaga ............... C09G 1/02 420/532 |
| 2017/0291264 | A1* | 10/2017 | Kirkham ............ B23K 35/0238 |

FOREIGN PATENT DOCUMENTS

| | | |
|---|---|---|
| CN | 107201464 A | 9/2017 |
| CN | 107760162 A | 3/2018 |
| CN | 108342627 A | 7/2018 |
| CN | 109097645 A | 12/2018 |
| EP | 1 698 710 A1 | 9/2006 |
| EP | 1 939 026 A1 | 7/2008 |
| EP | 1 939 027 A1 | 7/2008 |
| EP | 2623353 A1 | 8/2013 |
| EP | 2766247 A1 | 8/2014 |
| KR | 101084409 B1 | 11/2011 |

OTHER PUBLICATIONS

"Aluminium and aluminium alloys—Wrought products—Temper designations," Europaeische Norm—European Standard—Norme Europeenne, En 515: 1-16, XP002544658.

* cited by examiner

[Fig. 1]
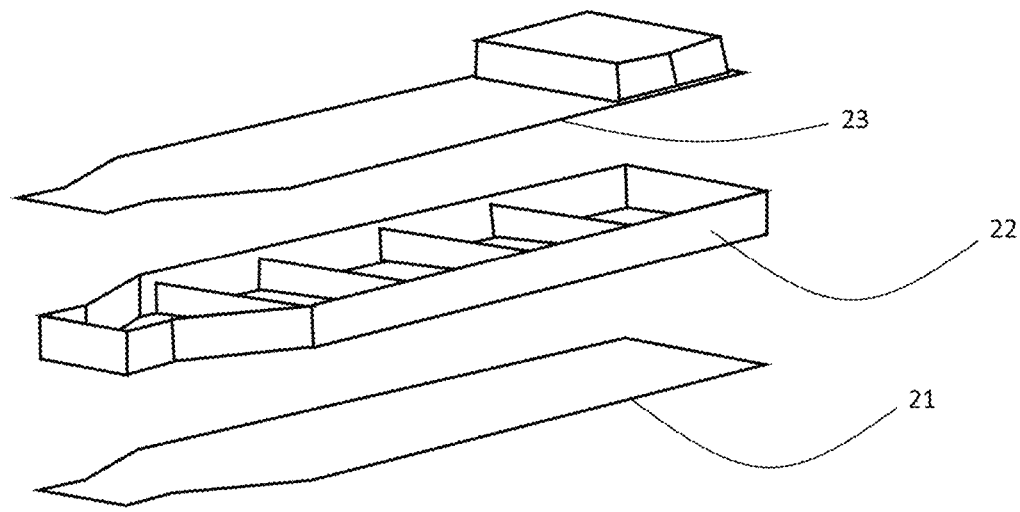
[Fig. 2]
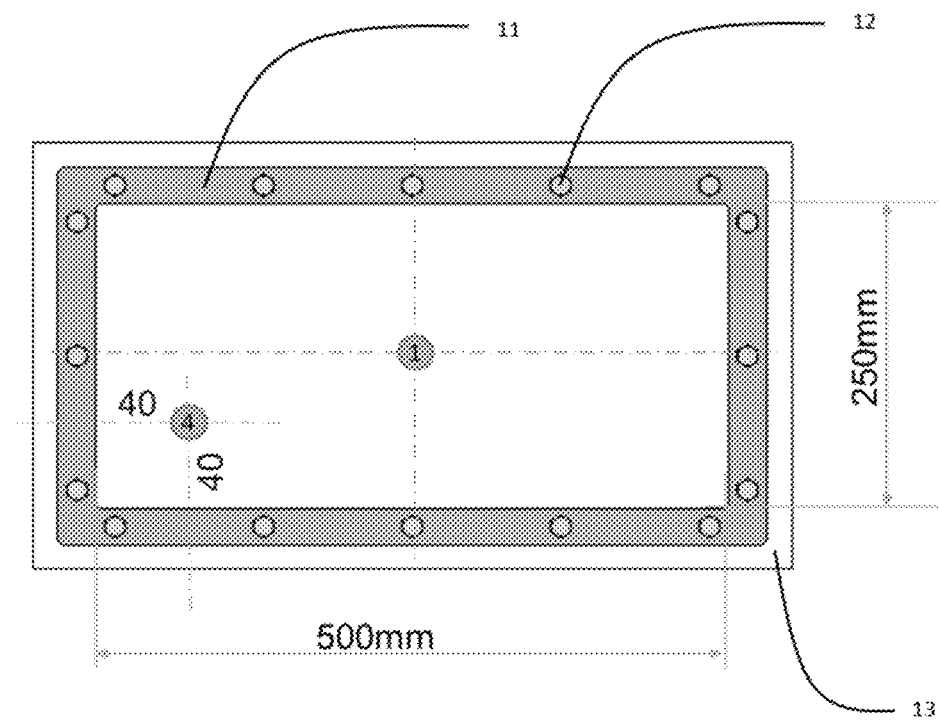

[Fig. 3]
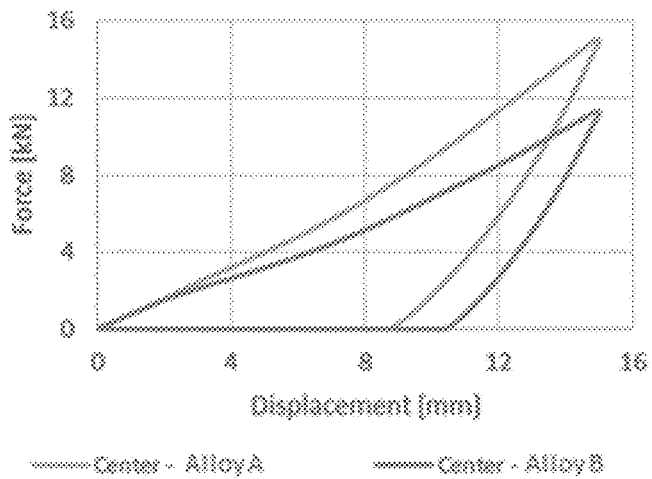
[Fig. 4]
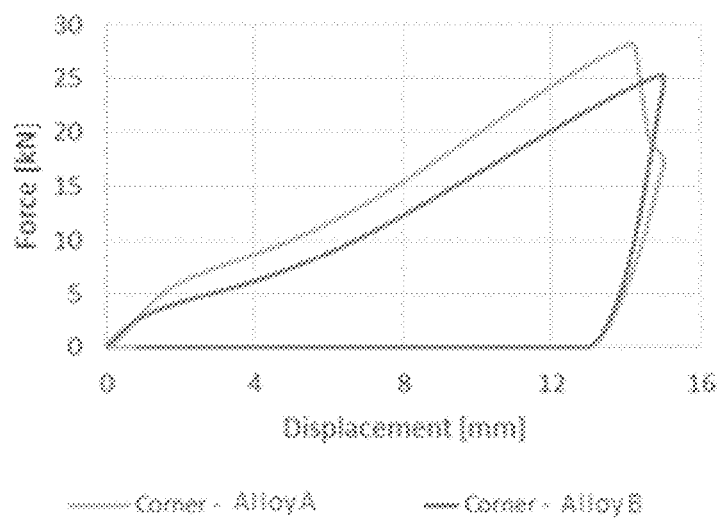

[Fig. 5]
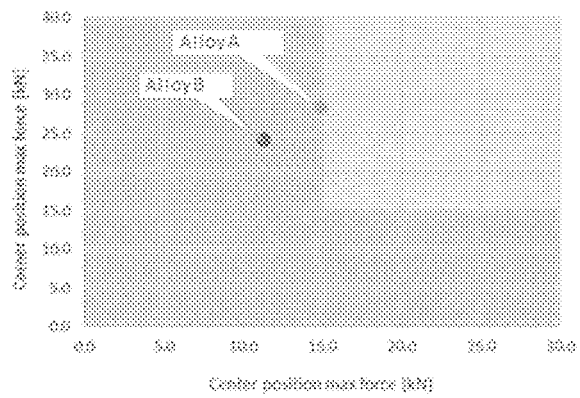
[Fig. 6]
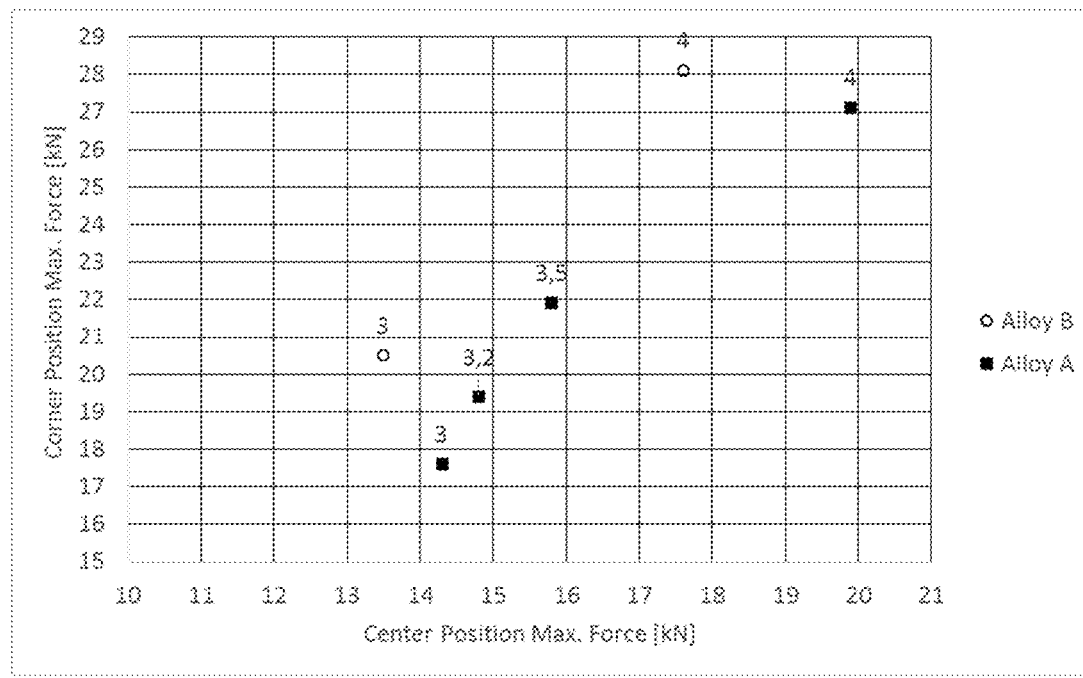

BATTERY BOX BOTTOM PART FOR ELECTRIC VEHICLES

FIELD OF THE INVENTION

The present invention concerns the field of electric or hybrid motor vehicles.

The present invention concerns more particularly battery boxes of such an electric or hybrid motor vehicle, consisting of a peripheral frame which has a generally convex polygonal shape in planar view, a bottom part which is joined to the lower surface of the peripheral frame made of aluminum alloy and a top cover for closing.

STATE OF THE ART

A battery box may comprise a chamber receiving electrical energy storage cell element units, enabling production of electrical energy for driving the electric or hybrid vehicle. The units of electrical energy storage cell elements are placed in the battery box, after which the battery box is mounted in an electric or hybrid motor vehicle.

An electric motor vehicle or hybrid vehicle (electric motor vehicle which is also provided with an internal combustion engine) requires a large number of batteries for driving a motor. Some examples of battery box of conventional batteries for electrical vehicles can be in references EP 1939026, US 2007/0141451, US 2008/0173488, US 2009/0236162, EP 2623353, EP 1939026, EP 1939027.

Such a battery box is required to have a good stiffness to prevent the container from being easily deformed even when the vehicle has an accident, and a protective function which, even when deformation reaches the container, minimizes breakage of the batteries. Therefore, a battery box is requested to have sufficient mechanical properties to protect the modules during crash impacts. CN106207044 discloses a carbon fiber composite material battery box made of carbon fiber interlayers, PVC foam laminated, allowing to increase the stiffness and the performance of side impact. CN205930892 discloses a utility model which uses honeycomb baffle structure in place of the bottom part to improve crash safety performance. EP2766247 proposes the use of shells and a free deformation space between the lateral wall of the battery sub-compartment and the vehicle body longitudinal beam.

A battery box is also required to be perfectly sealed, to avoid the ingress of any fluid into the battery box chamber or the leakage of any electrolyte contained into the electrical energy storage cell elements out of the battery box chamber. Tight sealing is particularly mandatory when the battery box is fixed under the floor of the vehicle to prevent water or mud ingress. In addition, corrosion resistance against inward or outward fluids is needed.

In order to improve the running performance of a vehicle, a battery box has to have a minimized weight while at the same time offering maximum resistance to crash, tight sealing, corrosion resistance, ability to accommodate temperature control and ability to contain the maximum number of electrical energy storage cell elements.

Patent application CN108342627 discloses an electric vehicle battery box prepared from the following raw materials in parts by mass: 0.4-0.9 parts of iron, 0.5-0.8 parts of titanium, 0.7-1.3 parts of zinc, 0.2-0.6 parts of silicon, 3-6 parts of nickel, 4-8 parts of copper, 1-3 parts of manganese, 80-90 parts of aluminum, 0.2-0.6 parts of boron carbide, 0.8-1 part of chromium oxide, 0.2-0.25 parts of magnesium oxide, 0.2-0.5 parts of silicon oxide, 0.2-0.5 parts of titanium oxide, 0.2-0.5 parts of yttrium oxide, 0.02-0.05 parts of beryllium carbide, 0.02-0.05 parts of zirconium carbide and 0.02-0.05 parts of tungsten carbide.

Patent application CN107201464 discloses an electric automobile battery box prepared from, by weight, 0.4-0.9 part of iron, 0.5-0.8 part of titanium, 0.7-1.3 part of zinc, 0.2-0.6 part of silicon, 0.1-0.15 part of titanium, 3-6 parts of nickel, 4-8 parts of copper, 1-3 parts of manganese and 80-90 parts of aluminum.

Patent application CN107760162 discloses a high-strength corrosion-resistant passenger car battery box which comprises a box body, wherein the box body is made of a high-strength alloy material; the surface of the box body is coated by a layer of a corrosion-resistant coating; the aluminum alloy material is prepared from the following components in percentage by mass: 0.21-0.47% of Mn, 1.83-3.75% of Cu, 0.23-0.47% of Ti, 2.35-7.48% of SiC, 0.13-0.54% of Er and the balance of pure aluminum and trace impurities.

Patent application EP1698710 discloses an aluminum-magnesium alloy sheet having a high strength prior to baking treatment, and having a high bake softening resistance, containing, as a percentage of mass, 2-5% magnesium, more than 0.05% and 1.5% or less iron, 0.05-1.5% manganese, and crystal grain refiner, the remainder comprising aluminum and inevitable impurities, and among the inevitable impurities, less than 0.20% silicon being contained, the total amount of iron and manganese being greater than 0.3%, the amount of iron dissolved in solid solution being 50 ppm or greater, 5000 or more intermetallic compounds with a circle-equivalent diameter of 1-6 μm existing per square millimeter, and the average diameter of the recrystallized grains being 20 μm or smaller.

The present invention has been developed to improve the battery box bottom part for electric or hybrid motor vehicles. The bottom part of the battery box may be made from sheets or extrusions. Whereas sheets offer complex bottom shape obtained with deep drawing and high protective space, extrusions enable high stiffness and possibility of integrating the cooling in the bottom of the battery enclosure. The present invention relates to a sheet product for the bottom part, which is simultaneously light, resistant against intrusion, sufficiently formable and sealable to provide a leak tight box, corrosion resistant, able to accommodate temperature variations, sufficiently stiff and strong, many of these properties being antagonistic.

OBJECT OF THE INVENTION

An object of the invention is a bottom part of battery box for electric or hybrid motor vehicles made from an aluminium alloy sheet having a thickness between 2 and 6 mm, wherein said aluminum alloy comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and unavoidable impurities up to 0.05 wt. % each and 0.15 wt. % total.

Another object of the invention is a method to make a bottom part of battery box according to the invention comprising successively preparing an aluminium alloy comprising comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and unavoidable impurities up to 0.05 wt. % each and 0.15 wt. % total;

casting said aluminium alloy into a rolling ingot;
homogenizing and/or reheating said rolling ingot;
hot rolling and optionally cold rolling said rolling ingot to obtain a sheet with a thickness between 2 mm and 6 mm.

DESCRIPTION OF THE FIGURES

Figures

FIG. 1 is an exploded view of a battery box for an electric or hybrid motor vehicle.

FIG. 2 shows the experimental set up of the intrusion test.

FIG. 3 shows an example of Force vs Displacement curve at the center position for Alloy A and Alloy B.

FIG. 4 shows an example of Force vs Displacement curve at the corner position for Alloy A and Alloy B.

FIG. 5 shows the positioning of alloy A and alloy B in graph of Center Position Maximum Force vs. Corner Position Maximum Force.

FIG. 6 shows the positioning of alloy A and alloy B in graph of Center Position Maximum Force vs. Corner Position Maximum Force, for a H2X (200° C.) temper, the thickness in mm is indicated above the data point.

DETAILED DESCRIPTION OF THE INVENTION

All aluminium alloys referred to in the following are designated using the rules and designations defined by the Aluminium Association in Registration Record Series that it publishes regularly, unless mentioned otherwise.

Metallurgical tempers referred to are designated using the European standard EN-515 (1993).

All the alloy compositions are provided in weight % (wt. %).

Unless mentioned otherwise, static mechanical characteristics, i.e., ultimate tensile strength $R_m$, tensile yield stress $R_{p0.2}$, uniform elongation at maximum force Ag and elongation at break A, are determined by a tensile test according to standard NF EN ISO 6892-1 (2016), the location at which the pieces are taken and their direction being defined in standard EN 485 (2016).

Unless otherwise specified, the definitions of standard EN 12258 (2012) apply. In particular, a sheet is a rolled product with a rectangular cross-section and a nominal thickness less than 6.35 mm but not less than 0.15 mm and with slit, sheared or sawed edges.

As illustrated by FIG. 1, a battery box for electric or hybrid motor vehicles includes a bottom part 21, an outer peripheral frame 22 formed to be positioned on an outer peripheral edge portion of the bottom part and a top plate or cover 23 placed on the peripheral frame from above. The outer peripheral frame is commonly joined to the bottom part by assembling means such as welding or bonding to ensure the resistance of the assembly and the sealing of the edges between the bottom part and the peripheral frame. The outer peripheral frame has a generally convex polygonal shape in planar view. The top cover is assembled to the peripheral frame by assembling means, such as rivets or screws and may also be sealed.

A specific intrusion test was designed to evaluate the resistance of the bottom part to intrusion. To evaluate the resistance of the sheet material against intrusion, two critical configurations on the bottom plate are possible, which are intrusion close to and far from the outer peripheral frame. Close to the frame, the mechanical system is stiff allowing only little deformation of the sheet during intrusion. Thus, fracture of the material is the dominant damage mechanism. In the center position, far from the frame, the system behaves elastically, and soft and plastic deformation is possible leading to a high risk of contact of the sheet with the battery modules. The test is carried out on a static loading machine Zwick 400. As illustrated by FIG. 2, the sheet 13 is clamped between an upper and a lower steel frame 11 having a width of 30 mm and fixed with several screws 12. A cylindrical punch with a diameter of 19.6 mm and rounded edges (r=1.5 mm) is fixed on the machine to perform an intrusion into the sheet. The force applied on the punch and its displacement are measured. The frame can be moved such as to test two positions on the same sheet center reference 1 and corner reference 4 positions, see FIG. 2. The total punch displacement during the test is set to a distance of 15 mm chosen to represent a typical space between the bottom plate and the batteries. The test is performed under quasi-static conditions. The maximal resistance of the sheet material is evaluated for the intrusion of an object into the bottom plate considering a load of 1.5 t.

In FIGS. 3 to 5 an example of intrusion test result for two 5xxx alloys in 4 mm thickness is presented. The following values are obtained from the tests to rank the intrusion behavior of the two materials.

For the center position: the force at 15 mm displacement of the punch, in this position no rupture is observed as illustrated by FIG. 3, this value is referred to as Center Position Maximum Force and is expressed in kN.

For the corner position: the maximum force value which is reached at the moment of rupture or at 15 mm if the sheet resists the rupture during the full displacement as illustrated by FIG. 4, this value is referred to as Corner Position Maximum Force and is expressed in kN.

Finally, the results are presented in a plot having the Center Position Maximum Force on the x-axis and the Corner Position Maximum Force on the y-axis, as illustrated by FIG. 5.

According to the invention there is provided a bottom part of battery box for electric or hybrid motor vehicles made from an aluminium alloy sheet having a thickness between 2 and 6 mm, wherein said aluminum alloy comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and unavoidable impurities up to 0.05 wt. % each and 0.15 wt. % total.

In particular, the present inventors have found that the sheets according to the invention provide an improved combination of intrusion properties, as described by the Center and Corner Position Maximum Force and corrosion properties, as described by the intergranular corrosion resistance of the sheet measured by Nitric Acid Mass Loss Test (NAMLT).

The sheets according to the invention are made of a SXXX series alloy having a Mg content from 2.5 to 4.0 wt. %. When the Mg content is lower than 2.5 wt. % the intrusion properties are insufficient, whereas when the Mg content is above 4.0 wt. % the corrosion resistance is insufficient. Preferably, the Mg content is from 2.8 to 3.6 wt. % and preferentially from 3.0 to 3.4 wt. % and even more preferably from 3.1 to 3.3 wt. %. The balance between in particular intrusion and corrosion properties is dependent on the chosen temper, however when the Mg content is not within the range according to the invention the balance is not satisfactory for any chosen temper.

The Mn content is from 0.1 to 0.8 wt. %. When the Mn content is lower than 0.1 wt. % the intrusion properties are insufficient. Preferably, the Mn content is from 0.5 to 0.7 wt. % and preferentially from 0.51 to 0.61 wt. %, in particular to improve again the intrusion properties.

The Si content is advantageously from 0.1 to 0.3 wt. % and preferably from 0.10 to 0.25 wt. %.

The Fe content is advantageously from 0.1 to 0.4 wt. % and preferably from 0.15 to 0.35 wt. %.

The Cu content is advantageously from 0.05 to 0.2 wt. % and preferably from 0.06 to 0.15 wt. %.

The Cr and/or Zn content is advantageously at most 0.05 wt. % and preferably at most 0.03 wt. %. The Ti content is advantageously from 0.01 to 0.08 wt. %.

The preferred content for Si, Fe, Cu, Cr, Zn and/or Ti are chosen in particular to improve the balance between in particular intrusion and corrosion properties, as well as formability, stiffness and strength.

After preparation of the alloy, a rolling ingot is obtained typically by vertical semi-continuous casting. The ingot is then optionally homogenized.

When homogenization is carried out, the temperature preferably chosen is between 535° C. and 550° C. for a duration of at least 12 hours. However, the present inventors have found that, surprisingly, excellent results are obtained in the absence of homogenization. In one embodiment, the homogenization step is not carried out, but a simple reheating is carried out before hot rolling at a temperature of between 500° C. and 550° C.

After homogenization and/or reheating, said ingot is hot-rolled and optionally cold rolled to obtain a sheet with a thickness between 2 mm and 6 mm. Preferably, a cold rolling step is performed in order to obtain the desired microstructure after final annealing.

The sheet may be in an H19 temper, as cold rolled, in an 0 temper, annealed to the lowest strength, or H2X temper, strain-hardened and partially annealed. Preferably, the sheet is used in an H2X temper. Preferably, the annealing to obtain the 0 temper is carried out at a temperature higher than 300° C. A preferred temper H2X may be further defined by adjusting the mechanical properties with the reference of the corresponding 0 temper of the sheet, at the same thickness. Advantageously, in the LT direction, the ultimate tensile strength Rm of the sheet is at least 25%, preferentially at least 35% and preferably at least 40% higher than the ultimate tensile strength of the sheet in 0 temper and/or the tensile yield strength $R_{p0.2}$ of the sheet is at least 115%, preferentially at least 125% and preferably at least 135% higher than the tensile yield strength of the sheet in 0 temper. Advantageously, in the H2X temper, the percentage of uniform elongation at maximum force Ag of the sheet is between 6% and 15% and preferably between 7.5% and 10%.

In a first embodiment, the annealing to obtain the preferred H2X temper is carried out at a temperature between 180° C. and 270° C. and preferentially at a temperature between 180° C. and 240° C. Preferably, the annealing time is less than 2 hours and preferentially less than one hour. In an embodiment, the H2X temper is obtained by heating to the desired temperature with no soaking time. This first embodiment is typically achieved by batch annealing, preferably under controlled inert atmosphere In a second embodiment, the annealing to obtain the preferred H2X temper is achieved with a continuous annealing furnace, the line speed and annealing temperature being adapted to obtain the targeted mechanical properties. The typical peak metal temperature (PMT) range to obtain the preferred H2X temper with a continuous annealing furnace is from 250° C. to 400° C. and preferably from 300° C. to 350° C.

Following annealing a surface treatment of the sheet adapted to assembly operations and/or finishing, and particularly adhesive bonding and/or welding and/or corrosion protection such as painting, may be advantageous. In particular, the formation of a chemical conversion coating, in which the initial passive film is replaced by a passivation film comprising other protective metallic elements, is an advantageous surface treatment. Thus, chemical conversion coating, in particular carried out with treatment agents containing chromates, or preferably treatment agents containing anions containing at least one element in the group consisting of zirconium, titanium, chromium with oxidation state III, cerium, vanadium, molybdenum, manganese is applicable. Preferred treatment agents are chromium-free for environmental reasons and use elements such as organo-phosphorous, silane and derivatives, titanium and/or zirconium. In a preferred embodiment, a chemical conversion coating containing Ti and Zr with 2 to 8 mg/m² of each of these elements on each face is provided.

Using a continuous annealing furnace provides the advantage to be able to apply a surface preparation directly after annealing, in-line, before coiling. Surface preparation can be also applied separately after batch annealing with a dedicated surface treatment line.

Finally, the sheet is cut to size and optionally formed to obtain a bottom part of battery box.

The bottom part of battery box of the invention is particularly advantageous because of it intrusion properties and corrosion resistance properties. In particular, the intergranular corrosion resistance of the sheet according to the invention measured by Nitric Acid Mass Loss Test NAMLT according to ASTM G67 standard is less than 3 mg/cm² and less than 5 mg/cm² after aging for 17 hours at 130° C.

With the products according to the invention, it is possible to use sheets having a reduced thickness. In particular, with the present invention it is provided a bottom part of battery box wherein the sheet has a thickness of at most 3.5 mm and wherein the Center Position Maximum Force and the Corner Position Maximum Force, expressed in kN are at least 14 kN and preferably at least 14.5 kN and more preferably at least 15 kN.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

EXAMPLES

In this example, several sheets made of rolling ingots having the composition disclosed in Table 1 were prepared. Alloys A and B are according to the invention. The rolling ingots were reheated at the temperature of 510° C.-545° C. for at least one hour, hot rolled and cold rolled to sheets having a final thickness between 2 and 5 mm.

The sheets were then annealed at 1 h at 350° C. for alloys A, B and D or 1 h at 320° C. for alloy C to a O temper or to a H2X temper by annealing 0.5 h at 255° C. or by annealing at 200° C. (heating to temperature with no soaking time), or kept to a H19 temper (as cold rolled).

TABLEAU 1

| | Si | Fe | Cu | Mn | Mg | Cr | Zn | Ti |
|---|---|---|---|---|---|---|---|---|
| A | 0.22 | 0.25 | 0.09 | 0.52 | 3.2 | 0.01 | 0.01 | 0.02 |
| B | 0.19 | 0.17 | 0.02 | 0.24 | 2.8 | 0.01 | 0.01 | 0.02 |
| C | 0.10 | 0.20 | 0.07 | 0.37 | 4.7 | 0.01 | 0.01 | 0.02 |
| D | 0.13 | 0.27 | 0.08 | 0.52 | 4.4 | 0.11 | 0.10 | 0.02 |
| E | 0.20 | 0.26 | 0.09 | 0.52 | 3.2 | 0.02 | 0.01 | 0.02 |

Composition of the ingots in wt. %

The tensile yield strength, $R_{p0.2}$, ultimate tensile strength, $R_m$, percentage uniform elongation at maximum force Ag and elongation at break A were determined in the transverse direction using methods known to one of ordinary skill in the art. The tensile tests were performed according to ISO/DIS 6892-1. The results are provided in Table 2.

TABLEAU 2

| Material Description | | | Mechanical Properties | | | |
|---|---|---|---|---|---|---|
| Alloy | Thickness (mm) | Temper | Rp0.2 [MPa] | Rm [MPa] | Ag [%] | A [%] |
| A | 3 | O | 118 | 244 | 20.1 | — |
| | 3 | H2X (255° C.) | 224 | 301 | 10.4 | 11.9 |
| | 3 | H2X (200° C.) | 304 | 355 | 7.6 | 9.3 |
| | 3 | H19 | 331 | 376 | 4.7 | 6.2 |
| | 4 | O | 112 | 241 | 18.4 | 22.9 |
| | 4 | H2X (255° C.) | 225 | 293 | 9.6 | 13.1 |
| | 4 | H2X (200° C.) | 276 | 337 | 9.4 | 11.7 |
| | 4 | H19 | 277 | 338 | 6.6 | 8.1 |
| | 3, 5 | H2X (200° C.) | 282 | 343 | 8.1 | 11.4 |
| | 3, 2 | H2X (200° C.) | 290 | 350 | 8.1 | 11.1 |
| | 2, 5 | O | 120 | 244 | 21.0 | 23.9 |
| | 2 | H2X (200° C.) | 315 | 367 | 8.0 | 9.8 |
| B | 3 | O | 104 | 212 | 18.9 | 23.1 |
| | 3 | H2X (255° C.) | 232 | 281 | 9.0 | 12.0 |
| | 3 | H2X (200° C.) | 249 | 296 | 6.7 | — |
| | 4 | O | 94 | 208 | 18.0 | 24.0 |
| | 4 | H2X (200° C.) | 231 | 281 | 7.4 | 11.2 |
| | 5 | H2X (255° C.) | 207 | 259 | 8.3 | 12.6 |
| C | 2, 5 | O | 146 | 281 | 23.0 | 26.3 |
| D | 3 | O | 147 | 298 | 19.4 | 21.1 |
| E | 3 | H2X (CA)* | 246 | 310 | 9.0** | 11.1 |

*CA: Continuous Annealing with a Peak Metal Temperature of 320° C./** estimate Mechanical properties The intergranular corrosion resistance of the sheets was measured by Nitric Acid Mass Loss Test (NAMLT) according to ASTM G67 standard. The results of the mass lost test are lower than 3 mg/cm² and lower than 5 mg/cm2 after aging 17 hours at 130° C. for the sheets according to the invention. The results are disclosed in Table 3.

TABLEAU 3

| Material Description | | | Corrosion [mass loss mg/cm²] | |
|---|---|---|---|---|
| Alloy | Thickness (mm) | Temper | as delivered | After 17 h at 130° C. |
| A | 3 | O | 1.2 | 2.1 |
| | 3 | H2X (255° C.) | 1.3 | 2.0 |
| | 3 | H2X (200° C.) | 2.4 | 3.9 |
| | 3 | H19 | 1.2 | 2.4 |
| | 4 | O | 1.4 | 1.4 |
| | 4 | H2X (255° C.) | 1.3 | 2.0 |
| | 4 | H2X (200° C.) | 2.2 | 3.9 |
| | 4 | H19 | 1.3 | 3.5 |
| B | 3 | O | 1.1 | 1.1 |
| | 3 | H2X (255° C.) | 1.2 | 1.2 |
| | 4 | O | 1.1 | 1.4 |
| | 5 | H2X (255° C.) | 1.2 | 1.1 |
| C | 2, 5 | O | 1.2 | 42.5 |
| D | 3 | O | 1.7 | 33.8 |

Corrosion properties

The Center Position Maximum and the Corner Position Maximum Force were characterized as previously described. The results are provided in Table 4. FIG. 6 illustrates the results obtained with the H2X (200° C.) temper for alloys A and B. The sheet thickness is provided above the symbols. In this preferred temper, there is an advantage to use alloy A compared to alloy B and it is possible to reduce the sheet thickness while still maintaining a significant intrusion resistance.

TABLEAU 4

| Material Description | | | Intrusion | |
|---|---|---|---|---|
| | | | Center Position | Corner Position |
| Alloy | Thickness (mm) | Temper | Max. Force [kN] | Max. Force [kN] |
| A | 3 | O | 9.3 | 20.6 |
| | 3 | H2X (255° C.) | 12.6 | 18 |
| | 3 | H2X (200° C.) | 14.3 | 17.6 |
| | 3 | H19 | 13.4 | 12.7 |
| | 4 | O | 14.9 | 28.4 |
| | 4 | H2X (255° C.) | 17.6 | 27.6 |
| | 4 | H2X (200° C.) | 19.9 | 27.1 |
| | 4 | H19 | 20.0 | 24.0 |
| | 3, 5 | H2X (200° C.) | 15.8 | 21.9 |
| | 3, 2 | H2X (200° C.) | 14.8 | 19.4 |
| | 2, 5 | O | 7.8 | 17.3 |
| | 2 | H2X (200° C.) | 9.1 | 10.1 |
| B | 3 | O | 8.1 | 18.1 |
| | 3 | H2X (255° C.) | 13.1 | 18.4 |
| | 3 | H2X (200° C.) | 13.5 | 20.5 |
| | 4 | O | 11.3 | 24.2 |
| | 4 | H2X (200° C.) | 17.6 | 28.1 |
| | 5 | H2X (255° C.) | 21.9 | 36.5 |
| C | 2, 5 | O | 8.0 | 19.5 |
| D | 3 | O | 10.7 | 23.5 |

Intrusion properties

The invention claimed is:

1. A bottom part of battery box for electric or hybrid motor vehicles made from an aluminium alloy sheet having a thickness between 2 and 6 mm, wherein said aluminum alloy comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and impurities up to 0.05 wt. % each and 0.15 wt. % total, wherein the sheet is in an H2X temper, strain-hardened and partially annealed.

2. The bottom part of battery box according to claim 1, wherein the Mn content is from 0.5 to 0.7 wt. %.

3. The bottom part of battery box according to claim 1, wherein the Si content is from 0.1 to 0.3 wt. %.

4. The bottom part of battery box according to claim 1, wherein the Fe content is from 0.1 to 0.4 wt. %.

5. The bottom part of battery box according to claim 1, wherein the Mg content is from 2.8 to 3.6 wt. %.

6. The bottom part of battery box according to claim 1, wherein the partial annealing of the H2X temper is obtained by an annealing at a temperature between 180° C. and 270° C.

7. The bottom part of battery box according to claim 1, wherein the partial annealing of the H2X temper is obtained with a continuous annealing furnace optionally with a peak metal temperature range from 250° C. to 400° C.

8. The bottom part of battery box according to claim 1, wherein a percentage of uniform elongation at maximum force of the sheet is between 6% and 15%.

9. The bottom part of battery box according to claim 1 wherein the sheet has a thickness of at most 3.5 mm and wherein a center position maximum force and a corner position maximum force, expressed in kN are at least 14 kN.

10. The bottom part of battery box according to claim 1, wherein an intergranular corrosion resistance of the sheet measured by nitric acid mass loss test NAMLT according to ASTM G67 standard is less than 3 mg/cm$^2$ and less than 5 mg/cm$^2$ after aging for 17 hours at 130° C.

11. The bottom part of battery box according to claim 1, wherein the Cu content is from 0.05 to 0.2 wt. %.

12. The bottom part of battery box according to claim 1, wherein the Cr content is at most 0.05 wt. %.

13. The bottom part of battery box according to claim 1, wherein the Zn content is at most 0.05 wt. %.

14. The bottom part of battery box according to claim 1, wherein the Ti content is from 0.01 to 0.08 wt. %.

15. A method to make a bottom part of battery box according to claim 1 comprising successively
    preparing an aluminium alloy comprising comprises 2.5 to 4.0 wt. % of Mg, 0.1 to 0.8 wt. % of Mn, 0.4 wt. % or less of Si, 0.5 wt. % or less of Fe, 0.5 wt. % or less of Cu, 0.1 wt. % or less of Cr, 0.1 wt. % or less of Zn, 0.1 wt. % or less of Ti, rest aluminium and impurities up to 0.05 wt. % each and 0.15 wt. % total;
    casting said aluminium alloy into a rolling ingot;
    homogenizing and/or reheating said rolling ingot;
    hot rolling and optionally cold rolling said rolling ingot to obtain a sheet with a thickness between 2 mm and 6 mm; and
    partially annealing the sheet to a H2X temper.

16. The method according to claim 15, further comprising
    partially annealing the sheet to a H2X temper, optionally at a temperature between 180° C. and 270° C.,
    optionally surface treating the sheet typically by formation of a chemical conversion coating,
    cutting to size and optionally forming.

17. The method according to claim 15, further comprising
    partially annealing the sheet to a H2X temper, in a continuous annealing furnace optionally with a peak metal temperature range from 250° C. to 400° C.,
    optionally surface treating the sheet typically by formation of a chemical conversion coating,
    cutting to size and optionally forming.

18. The method according to claim 15, wherein
    homogenizing said rolling ingot at a temperature between 535° C. and 550° C. for a duration of at least 12 hours, or
    reheating said rolling ingot at a temperature between 500° C. and 550° C.

19. The method according to claim 16, comprising partially annealing the sheet to a H2X temper at a temperature between 180° C. and 240° C.

20. The method according to claim 17, comprising partially annealing the sheet to a H2X temper, in a continuous annealing furnace with a peak metal temperature range from 300° C. to 350° C.

* * * * *